Patented Oct. 21, 1947

2,429,582

UNITED STATES PATENT OFFICE 2,429,582

PROCESS FOR PRODUCING POLYMERS OF BRANCHED CHAIN HEXADIENES

Rupert C. Morris and John L. Van Winkle, Berkeley, Calif., assignors to Shell Development Company, San Francisco, Calif., a corporation of Delaware No Drawing. Application November 4, 1944, Serial No. 562,051

2 Claims. (Cl. 260—680)

This invention relates to a process and products of low molecular weight polymers of branch-chain 1,3-hexadienes having in the molecule a straight chain of 5 carbon atoms.

The production of dimers, trimers and the like of 1,3-butadiene and other diene hydrocarbons by non-catalytic polymerization is known. It is also known that when 1,3-butadiene and many of its homologs are heated with sulfur dioxide in the presence of air or a peroxide, linear polysulfones are produced. Cyclic monosulfones of these dienes can be obtained by reacting the diene with sulfur dioxide in the absence of air or of a peroxide. The cyclic monosulfones can be decomposed by heating to the original monomeric dienes and sulfur dioxide.

We have discovered wholly new low molecular weight polymers of branch-chain 1,3-hexadienes having in the molecule a straight chain of 5 carbon atoms. These polymers as ordinarily produced have an average molecular weight of slightly more than 600 (ebullioscopic in benzene) and are made up of an average of about seven monomer units. They are unsaturated and contain in the molecule a cyclic structure believed to be capable of representation as follows:

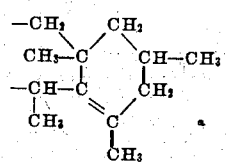

The new polymers have unique properties which make them of great value in numerous applications more fully described hereinafter. So far as is known, corresponding polymers have not been produced from any other dienes.

Further, we have discovered methods for the production of these new polymeric compounds. We have found that the polymers can be produced by polymerizing branch-chain 1,3-hexadienes having a straight chain of 5 carbon atoms in the presence of sulfur dioxide and of oxygen or oxygen-yielding compounds, preferably at elevated temperatures. The polymers can be produced also by the thermal decomposition of cyclic monosulfones, which can be obtained by reacting the designated 1,3-hexadienes with sulfur dioxide in the substantial absence of air or peroxides. These reactions are wholly different from the corresponding reactions of other dienes and are altogether unexpected.

Any branch-chain 1,3-hexadiene having a straight chain of 5 carbon atoms may be employed in the production of the new polymers. A single hexadiene may be polymerized in the presence of sulfur dioxide, or two or more hexadienes may be so polymerized in admixture with one another. It is preferred to use a mixture of 2-methyl-1,3-pentadiene and 4-methyl-1,3-pentadiene, e. g. a mixture of about 85 parts by weight of the former with about 15 parts by weight of the latter, such as may be obtained by dehydrating 2-methyl-2,4-pentanediol.

In the polymerization of the hexadienes in the presence of sulfur dioxide, molecular oxygen or an oxygen-yielding catalyst should be present. Air is a suitable source of molecular oxygen. Preferred oxygen-yielding catalysts are peroxides. The peroxides of the 1,3-hexadienes themselves are effective. Other suitable peroxides include benzoyl peroxide, acetyl peroxide, benzoyl acetyl peroxide, lauroyl peroxide, ditertiary butyl peroxide, tertiary butyl hydroperoxide, etc. Hydrogen peroxide, other inorganic peroxides, ozone, ozonides and the like may be employed. A single catalyst may be used, or two or more catalysts may be employed simultaneously or sequentially.

Very small amounts of catalyst are effective. An appreciable yield of polymer may be obtained when only traces of peroxide are present. Amounts as small as about 5 milliequivalents of active oxygen per liter of liquid hexadiene may be sufficient. Better yields and faster polymerization are obtained by the use of larger amounts of catalyst. Amounts between about 10 and about 100 milliequivalents of active oxygen per liter of liquid hexadiene are preferred, although larger amounts may be employed, the upper limit being dependent principally upon safety precautions.

The amount of sulfur dioxide employed may be varied over a wide range. It is preferred to use at least one mol of sulfur dioxide per mol of hexadiene reactant. Larger amounts, e. g. 10 mols, or smaller amounts, e. g. 0.1 mol or less, of sulfur dioxide per mol of hexadiene may be employed.

In general, temperatures of 80° C. or above are required for good yields, although in some cases somewhat lower temperatures may be used. Significant amounts of polymer may, however, be produced at temperatures down to 0° C. and below. Temperatures between about 90° and about 120° C. are preferred. Any temperature up to the point at which decomposition or degradation of the polymer products occurs at a significant rate may be employed. Usually temperatures substantially above about 200° C. should be avoided.

The reaction is preferably carried out in liquid phase under superatmospheric pressures. Pressures sufficient only to maintain a liquid phase in the reaction zone at the temperatures used are satisfactory, although much higher pressures, e. g. many thousand pounds per square inch, may be used.

The reaction may be carried out in a continuous or batchwise manner. If desired, one or more homogenizing fluids may be present. Suitable homogenizing fluids may be substances which are liquids or gases at ordinary temperatures and pressures. Normally gaseous substances may be used which are liquid or gaseous under the reaction conditions employed. Homogenizing fluids are preferably solvent diluents for both the sulfur dioxide and the hexadiene ingredients of the reaction mixture and are substantially inert under the conditions involved. Typical homogenizing agents are paraffin hydrocarbons, ethers, alcohols, olefins, aromatic hydrocarbons, hot acid octanes, etc. Satisfactory results may be obtained without the use of homogenizing agents.

The principal products of the reaction of the designated hexadienes in the presence of sulfur dioxide, in accordance with the invention, are low molecular weight polymers of the hereinbefore-designated hexadienes. Yields of 90% and more may be obtained where the reaction is conducted within the preferred temperature range.

Under practical conditions of production the polymers are ordinarily contaminated with unreacted sulfur dioxide, unreacted hexadienes and dimethylsulfolenes obtained as byproducts. The first two contaminants mentioned may be removed by volatilization, with or without recovery. Flash distillation methods are preferred. Reduced pressures may be employed, if desired, although they are ordinarily unnecessary. Dimethylsulfolenes, which may be present as byproducts, may be decomposed as described hereinafter.

The low molecular weight polymers of the invention can be produced also by the thermal decomposition of one or more dimethylsulfolenes. These cyclic monosulfones are obtainable by reacting in liquid phase one or more of the afore-designated hexadienes (preferably peroxide-free) with sulfur dioxide in the substantial absence of molecular oxygen and of oxygen-yielding substances, the reaction being conducted at an elevated temperature which is below that at which the monosulfones formed will decompose, temperatures in the neighborhood of about 100° C. being generally suitable. Monosulfones may be employed which have been produced by any other suitable process.

Typical suitable cyclic monosulfones are 2,2-dimethyl-3-sulfolene, 2,3-dimethyl-3-sulfolene, 2,4-dimethyl-3-sulfolene, 2,5-dimethyl-3-sulfolene, etc., and the corresponding 2-sulfolene compounds.

The term "sulfolene," as employed herein and in the appended claims, refers to an unsaturated structure containing four carbon atoms, a single olefin linkage between any two adjoining carbon atoms, and a sulfur atom in a ring, the sulfur atom of this five-membered heterocyclic unsaturated ring having two oxygen atoms attached thereto. This compound has also been called "thiacyclopentene-1,1-dioxide."

The double bond in the sulfolenes may be between any two of the adjacent carbon atoms of the ring, the generic term "sulfolene" covering both the simple, unsubstituted sulfolenes, i. e., 3-sulfolene having the structure:

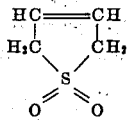

and 2-sulfolene having the structure:

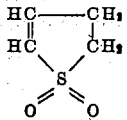

as well as the various derivatives thereof, i. e. sulfolenes in which various radicals are substituted for one or more of the hydrogen atoms of the above structures.

The numbering system of the sulfolene ring (and of the corresponding saturated sulfolane ring) is indicated below:

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84.

Other dimethyl-3-sulfolenes may be employed.

Thermal decomposition of the dimethylsulfolenes may be effected under a wide range of conditions. A simple procedure comprises merely heating the compounds under a reflux condenser, the rate of cracking being so controlled by the temperature employed that the evolved sulfur dioxide does not sweep away the reactant or other products. Inert diluents need not be employed, although they may be present, if desired. Decomposition is preferably effected in the presence of oxygen and/or peroxides, although less preferably it may be effected in some cases in their substantial absence.

Cracking in the presence of air under atmospheric pressure ordinarily begins to occur at a significant rate at about 80° C. The temperature is ordinarily raised gradually as the reaction progresses. Temperatures up to about 200° C. may be employed.

If desired, the process may be carried out in a continuous manner. Superatmospheric or reduced pressures may be employed. However, reduced pressures favor the production of the original monomers at the expense of the polymers. The sulfur dioxide obtained as a product may be discarded or recovered and recycled. In most cases a small amount of monomeric hexadienes is formed as a byproduct. These may be removed from the reaction mixture by distillation, preferably by flash distillation, or other methods.

The crude product obtained either from the designated monomeric hexadienes by polymerization in the presence of sulfur dioxide and of oxygen or oxygen-yielding substances, or by the cracking of dimethylsulfolenes, is a yellow, viscous liquid consisting principally of a mixture of low molecular polymers of the hexadienes having in the molecule about one unsaturated carbon-to-carbon linkage for each hexadiene unit (molecule of hexadiene combined in the polymer). The crude product may contain a very small amount (a trace) of sulfur-containing impurities and of unreacted hexadienes. These impurities can be removed and a stable, more uniform product obtained simply by maintaining the polymers at an elevated temperature, desirably 200° C. to 225° C., preferably under atmospheric or reduced pressures, in the presence of air or of molecular oxygen-free fluids. Heating for 2 to 4 hours is ordinarily satisfactory, although shorter or longer periods may be employed. Under some conditions at least some of the hexadiene dimer present in the crude polymer may be removed by purification in this manner. The thus purified mixture of polymers gives a negative test for sulfur and sulfur-containing compounds.

The pure or crude mixture of polymers may be separated into several fractions by distillation, preferably under reduced pressures, or by other methods such as solvent extraction, etc. Fractions boiling below about 380° C. under atmospheric pressures consist principally of dimers, trimers and tetramers (which contain cyclic structures) of the hexadienes. Approximately 52% of the polymeric substance boils above about 380° C. under atmospheric pressures and consists essentially of a seven-unit polymer (having a polymerization degree of about seven) believed to contain in the molecule the structure

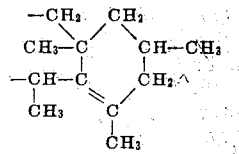

This higher molecular weight fraction is obtained as a yellow, very viscous, sticky liquid, soluble in hydrocarbons.

For most purposes the mixture of polymers need not be fractionated but may be employed as such in the many applications for which the polymers have been found suitable. If desired, however, any fraction or combination of fractions may be used in place of the whole mixture.

These new cyclic polymers have air-drying properties. They may be used in the presence or absence of siccatives such as the cobalt, lead and manganese naphthenates, linoleates, resinates, etc. They are valuable as synthetic drying oils in lacquers, varnishes, enamels and like coating compositions. Coatings produced from these polymers display remarkable resistance to water and to numerous chemicals, including concentrated sulfuric acid and concentrated sodium hydroxide. The polymers may be employed in impregnating bibulous material such as fabric.

The polymers have been found useful as vulcanizable plasticizers and tackifiers for natural and synthetic rubbers, and for plastics of many kinds. Adhesive compositions comprising rubbery substances plasticized with the polymers of the invention are valuable in the production of pressure-sensitive adhesive tapes and in other adhesive uses.

The polymers may be isomerized by known or special methods whereby the double bonds are brought into conjugated relationship and their activity, particularly their drying properties, is increased. The polymers may be subjected to bodying treatments such as blowing with air, heating in the presence of oxygen, etc. They may be subjected to many other kinds of chemical and physical treatment whereby their properties are significantly altered. They may be employed as chemical intermediates in the production of valuable chemical compounds of great variety.

Some of the many ways in which the invention may be carried out are illustrated by the following examples in which parts are on a weight basis:

*Example I*

2,4-dimethyl-3-sulfolene, 904 parts, was placed in a glass reaction kettle under a water-cooled reflux condenser open to the atmosphere and heated slowly. When the kettle temperature reached 87° C. decomposition of the sulfone was evident. The temperature was thereafter regulated to provide for the decomposition of the sulfone at such a rate that the sulfur dioxide evolved did not sweep any of the reactant or other products out of the kettle. Evolved sulfur dioxide was discarded. At the end of three hours, when the decomposition was substantially complete, the temperature had reached 151° C. Heating was continued for an additional four hours, the temperature being raised gradually to 191° C. The residue, 494 parts, was a crude mixture of low molecular weight polymers, containing 0.06% of sulfur. The polymer was stabilized and purified by heating in an open vessel exposed to the air at 200°–225° C. for four hours. No sulfur could be detected in the purified polymer.

*Example II*

A steel kettle was charged with 957 parts of a mixture of 2-methyl-1,3-pentadiene with 4-methyl-1,3-pentadiene (about 85% of the former and about 15% of the latter, obtained by the dehydration of 2-methyl-2,4-pentanediol) containing about 25 milliequivalents of active oxygen per liter of the mixture at room temperature and 3,147 parts of sulfur dioxide. The kettle was sealed and maintained at about 100° C. for four hours. It was then cooled. The contents of the kettle were removed and warmed in a vessel exposed to the atmosphere to volatilize remaining unreacted sulfur dioxide. The liquid residue separated into two layers. The upper layer, 271 parts, consisted of a mixture of low molecular weight polymers of the dienes. The lower layer, 886 parts, consisted principally of dimethylsulfolenes.

The mixture of polymers (separated from the dimethylsulfolenes) had a viscosity of 64.4 and 7.00 centistokes at 100° F. and 212° F., respectively. The average molecular weight (ebullioscopic in benzene) was about 610.

The polymer mixture was subjected to fractional distillation under atmospheric pressures. 29.6% of the mixture was removed at below 305° C.; the residue had a viscosity of 1,149 centistokes at 100° F. 47.8% of the mixture was removed at below 380° C.; the residue had a viscosity of 4,242 centistokes at 100° F. and was a yellow, very viscous, sticky liquid, soluble in hydrocarbons.

*Example III*

To 100 parts of the unfractionated mixture of low molecular weight hexadiene polymers obtained in accordance with Example I was added a mixture of cobalt, manganese and lead naphthenates containing 0.025 part of cobalt, 0.01 part of manganese and 0.2 part of lead. Metal panels were coated with thin films of the substance and baked for three hours at 140° C. The resulting films were hard and brown. They were not affected by immersion in water for 24 hours. They were not attacked by concentrated sulfuric acid nor by 50% aqueous sodium hydroxide.

The term "unsaturated" as used herein refers to carbon-to-carbon unsaturation of aliphatic character. The term "polymerization" refers to polymerization through carbon-to-carbon unsaturation with a corresponding reduction in unsaturation and with the resulting production of higher molecular weight compounds, called "polymers."

Molecular weight determinations referred to herein were made in accordance with the procedure described by B. J. Mair in the Bureau of Standards Journal of Research, 14, 345 (1935).

We claim as our invention:

1. A process of producing polymers comprising heating a dimethylsulfolene in the presence of a member of the group consisting of molecular oxygen and peroxides at between about 80° C. and about 200° C.

2. A process of producing polymers comprising heating 2,4-dimethyl-3-sulfolene in the presence of a member of the group consisting of molecular oxygen and peroxides at between about 80° C. and about 200° C.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,368,484 | Mottern | Jan. 30, 1945 |
| 2,374,932 | Guyer | May 1, 1945 |
| 2,380,832 | Frey et al. | July 31, 1945 |

OTHER REFERENCES

Bachman et al., J. A. C. S., vol. 66, 1513–14 (1944).

Bachman et al., J. A. C. S., vol. 64, 787–790 (1942).

Craig, J. A. C. S., vol. 65, 1006–1013 (1943).

Backer et al., Rec. Trav. Chem., vol. 58, 778–84 (1939).

Whitby et al., Canadian Jour. of Res., vol. 6, 280–291 (1932).